(12) United States Patent
Freeman et al.

(10) Patent No.: US 11,956,617 B2
(45) Date of Patent: Apr. 9, 2024

(54) AUDIO SYSTEM

(71) Applicant: Bose Corporation, Framingham, MA (US)

(72) Inventors: Eric Freeman, Sutton, MA (US); David Dick, Marlborough, MA (US)

(73) Assignee: BOSE CORPORATION, Framingham, MA (US)

( * ) Notice: Subject to any disclaimer, the term of this patent is extended or adjusted under 35 U.S.C. 154(b) by 31 days.

(21) Appl. No.: 17/396,660

(22) Filed: Aug. 7, 2021

(65) Prior Publication Data

US 2023/0044582 A1    Feb. 9, 2023

(51) Int. Cl.
| | | |
|---|---|---|
| H04S 7/00 | (2006.01) | |
| G06F 3/16 | (2006.01) | |
| H04R 1/02 | (2006.01) | |
| H04R 3/12 | (2006.01) | |
| H04R 5/02 | (2006.01) | |

(52) U.S. Cl.
CPC .............. *H04S 7/303* (2013.01); *G06F 3/165* (2013.01); *H04R 1/028* (2013.01); *H04R 3/12* (2013.01); *H04R 5/02* (2013.01); *H04S 7/307* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 10,506,361 B1* | 12/2019 | Pallamsetty | H04R 5/02 |
| 2010/0322435 A1* | 12/2010 | Suzuki | H04R 1/323 |
| | | | 381/92 |
| 2013/0051572 A1* | 2/2013 | Goh | H04S 7/302 |
| | | | 381/59 |
| 2013/0202132 A1* | 8/2013 | Zurek | H04M 1/6016 |
| | | | 381/107 |
| 2014/0334669 A1* | 11/2014 | Acharya | G06F 3/0304 |
| | | | 382/103 |
| 2016/0286313 A1* | 9/2016 | Kofman | H04R 3/12 |
| 2016/0353205 A1* | 12/2016 | Munch | H04R 3/14 |
| 2018/0288556 A1* | 10/2018 | Kyung | H04S 7/303 |
| 2019/0394602 A1* | 12/2019 | Moore | H04S 7/305 |
| 2022/0132248 A1* | 4/2022 | Basavarajappa | H04S 7/303 |

* cited by examiner

*Primary Examiner* — Duc Nguyen
*Assistant Examiner* — Assad Mohammed
(74) *Attorney, Agent, or Firm* — BOSE CORPORATION

(57) ABSTRACT

An audio system with a loudspeaker configured to create an audio output, a sensor configured to detect at least the presence of at least one person at a position relative to the loudspeaker, and a processor configured to cause the loudspeaker to alter the audio output based on the position of the at least one person relative to the loudspeaker. Altering of the audio output includes adjusting at least one of a volume, a time delay, an equalization, or a radiation pattern of the audio output.

21 Claims, 4 Drawing Sheets

AUDIO SYSTEM

BACKGROUND

This disclosure relates to an audio system.

When there are multiple loudspeakers in a room and a person moves relative to the loudspeakers, the person's perception of the sound from the loudspeakers may change.

SUMMARY

Aspects and examples are directed to an audio system in which the audio output of one or more loudspeakers is configured to change based on the position of a person relative to the loudspeakers. This system can be used to help the listener maintain better immersion in audio from multiple loudspeakers as the listener moves around the room or other location in which the loudspeakers are located.

In some examples the loudness or volume of a loudspeaker is adjusted to better balance sound from multiple loudspeakers. For example, if a user moves closer to one loudspeaker its gain can be reduced so that the sound from that loudspeaker doesn't overwhelm the sound from other loudspeakers.

In some examples a time delay of sound from a loudspeaker is adjusted to better balance sound from multiple loudspeakers. For example, delay can increase as the listener approaches the loudspeaker so that the sound from multiple loudspeakers arrives closer to the same time than would be the case if there was no delay.

In some examples equalization and level are adjusted to compensate for loudspeaker directionality. For example, loudspeakers can become more directional at higher frequencies. The frequency response at a given angle can be compensated by adjusting the output level and equalization based on the listener's angular position relative to the nominal main direction of sound propagation of the loudspeaker, for example if the listener is in front of, behind, or off to the side of the loudspeaker.

In some examples the directivity of the main sound lobe of a multiple audio driver loudspeaker is adjusted based on the listener's position. For example, a phased array speaker system can generate directional sound. When the listener's angular position relative to the loudspeaker is known, sound can be directed at the position. Directivity can be accomplished using beamforming techniques.

All examples and features mentioned below can be combined in any technically possible way.

In one aspect, an audio system includes a loudspeaker configured to create an audio output, a sensor configured to detect at least the presence of at least one person at a position relative to the loudspeaker, and a processor configured to cause the loudspeaker to alter the audio output based on the position of the at least one person relative to the loudspeaker. Altering of the audio output includes adjusting at least one of a volume, a time delay, an equalization, or a radiation pattern of the audio output.

Some examples include one of the above and/or below features, or any combination thereof. In an example the processor is configured to cause the loudspeaker to adjust the volume and time delay of the loudspeaker audio output based on the position of the at least one person relative to the loudspeaker. In some examples the sensor is configured to determine a distance of a person from the loudspeaker. In an example the processor is configured to cause the loudspeaker to alter its audio output at least in part based on the distance of the person from the loudspeaker. In an example the sensor is part of the loudspeaker. In an example the sensor is selected from the group of sensors consisting of a LIDAR sensor, an ultra-wide band sensor, a simultaneous location and mapping (SLAM) system, a time-of-flight infrared (IR) camera, an IR motion sensor, a SONAR sensor, a WiFi fingerprinting system, and a video camera.

Some examples include one of the above and/or below features, or any combination thereof. In some examples the audio system includes a plurality of loudspeakers spaced about a listening space. In an example the processor is configured to alter a volume of the audio outputs of the plurality of loudspeakers. In an example the processor is configured to alter a time delay of the audio outputs of the plurality of loudspeakers.

Some examples include one of the above and/or below features, or any combination thereof. In some examples the sensor is configured to determine a distance of the person from each of the plurality of loudspeakers. In an example the processor is configured to cause each of the plurality of loudspeakers to alter their audio outputs based on the distance of the person from that loudspeaker. In an example each of the plurality of loudspeakers comprises a proximity sensor. In an example each proximity sensor is selected from the group of proximity sensors consisting of a LIDAR sensor, an ultra-wide band sensor, a simultaneous location and mapping (SLAM) system, a time-of-flight infrared (IR) camera, an IR motion sensor, a SONAR sensor, a WiFi fingerprinting system, and a video camera.

Some examples include one of the above and/or below features, or any combination thereof. In some examples each loudspeaker is configured to communicate with at least one other loudspeaker. In an example one of the plurality of loudspeakers is configured to send commands to the other loudspeakers of the plurality of loudspeakers to alter the outputs of each of the other loudspeakers based on the determined location of the person relative to that loudspeaker. In an example the commands are configured to cause each loudspeaker to adjust at least one of the volume and time delay of its audio output. In an example each loudspeaker comprises a sensor, and each loudspeaker is configured to communicate with each other loudspeaker, to coordinate alterations of the audio outputs of the plurality of loudspeakers.

Some examples include one of the above and/or below features, or any combination thereof. In an example the loudspeaker comprises a plurality of audio drivers, and the processor is configured to cause the drivers to alter their level and phase to change a directivity of the collective output of the plurality of audio drivers. In another example a compensation for the radiation pattern of the audio output comprises a volume compensation across a frequency range.

In another aspect an audio system includes a plurality of loudspeakers spaced about a listening space. Each loudspeaker is configured to create an audio output. There is a sensor associated with each loudspeaker. Each sensor is configured to detect the presence of at least one person at a position relative to the loudspeaker with which the sensor is associated. A processor is configured to cause each loudspeaker to alter a volume and a time delay of its audio output based on the distance of the at least one person relative to the loudspeaker. In an example the plurality of loudspeakers are configured to communicate, to coordinate alterations of the audio outputs of the plurality of loudspeakers.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

DETAILED DESCRIPTION

Figure 1:
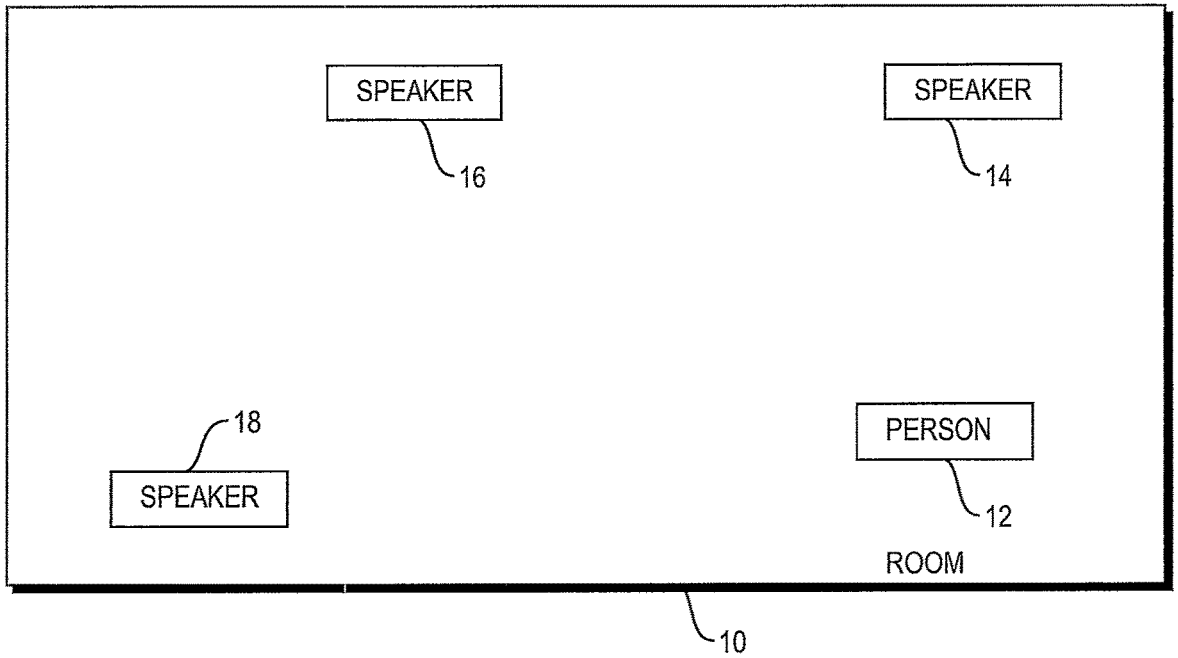
FIG. 1 is schematic diagram of an audio system.

Listeners generally prefer to hear all of multiple loudspeakers (speakers) in a room or other listening area equally anywhere in the room. This phenomenon is sometimes known as "immersive audio," which in addition to its ordinary meaning also means for the purpose of this disclosure more evenly balanced and/or more evenly distributed sound across the space of an environment (e.g., a room). The immersive audio experience is illusive unless the speakers have been carefully positioned or highly directional acoustics are used, and even then immersion is typically limited to a predefined location in the listening area.

Immersive audio can be accomplished by controlling at least the output (volume) and time delay of multiple speakers based on the position of the listener relative to the speakers, such that the listener is able to hear each speaker regardless of position in the listening area and the sound from the multiple speakers arrives approximately simultaneously at the listener regardless of listener's position in the listening area. Other audio output parameters that can be controlled include the equalization, and the radiation pattern. In an example the control of the equalization involves a treble boost when the listener is off-axis of a speaker that is directional at high frequencies.

Examples of the systems, methods and apparatuses discussed herein are not limited in application to the details of construction and the arrangement of components set forth in the following description or illustrated in the accompanying drawings. The systems, methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the computer program products, systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

In some examples an audio system includes a loudspeaker or multiple speakers, and a processor that is configured to cause the loudspeakers to alter their audio outputs based on the position of a listener relative to the loudspeaker. The processor can be configured to cause the loudspeaker to alter a volume and/or the time delay of the speaker based on the position of the listener relative to the speaker. In some examples the position of the user is determined by a proximity sensor or another sensor that is configured to determine a distance and/or the angular position of the person relative to the loudspeaker. In an example the proximity sensor is part of the loudspeaker, or it can be a separate device or system that communicates with the speaker. In some examples one speaker is the master device that is configured to command the loudspeakers to alter their audio outputs at least in part based on the distance of the person from the loudspeaker. In some examples the processor is configured to cause the loudspeaker to alter at least one of a spectrum and a radiation pattern of the loudspeaker audio output. In an example there are a number of audio drivers in a housing and the processor is configured to cause the drivers to alter their level and phase as a function of frequency, to change a directivity of the collective output of the drivers.

FIG. 1 illustrates room 10 in which are located separate speakers 14, 16, and 18, each of which is at a different location from (i.e., distance from and/or angle from) listener 12. In order to provide to listener 12 immersive audio played over speakers 14, 16, and 18, the volume of sound from each speaker, and the time of arrival of the sound from each speaker, should be approximately the same at the location of listener 12.

Figure 2:
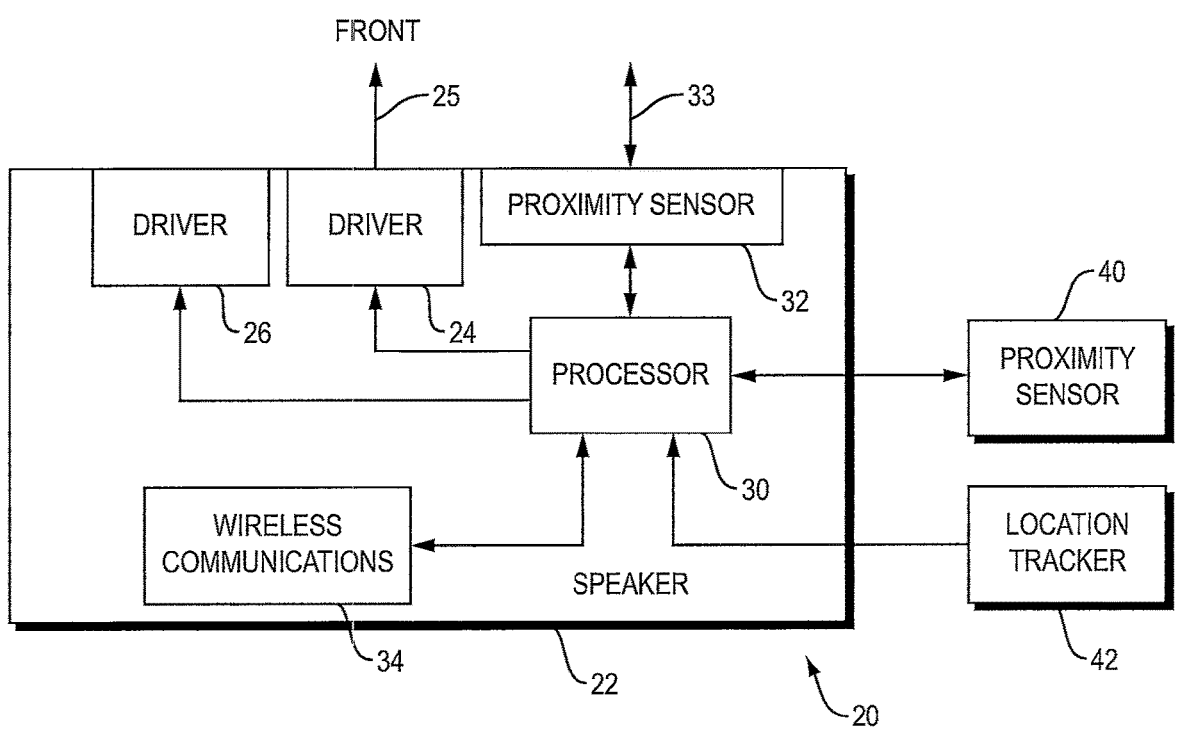
FIG. 2 is a schematic diagram of a loudspeaker for an audio system.

FIG. 2 illustrates system 20 that includes speaker 22. Speaker 22 includes audio driver 24 that is arranged such that its primary direction of maximum sound radiation at most or all frequencies is from its "front" 25. In some examples driver 24 is considered to be an omni-directional driver, although that is not a limitation of the disclosure. The direction of the front of driver 24 will depend on the placement of speaker 22 in the room, which is not under control of the speaker manufacturer. Portable speakers can be placed almost anywhere in a room. Other speakers may be mounted in the ceiling. Stereo speakers are often placed spaced apart and facing an ideal listening location. It should be noted that speaker 22 can include more than one driver, as indicted by second driver 26. In some examples multiple drivers are useful in situations where drivers are beamformed, as further explained elsewhere herein.

Speaker 22 also includes proximity sensor 32 that is configured to sense the presence of a person in a sensing area, as indicated by arrow 33. In some examples sensor 32 is configured to detect one or more of the presence of a person, the distance to a person, and the angle of a person to proximity sensor 32. Proximity sensor 32 uses any now-known or future-developed sensing technology, including but not limited to a LIDAR-based sensor, an ultra-wide band sensor, a simultaneous location and mapping (SLAM) system, a time-of-flight infrared (IR) camera, an IR motion sensor, a SONAR sensor, a WiFi fingerprinting system, and a video camera (such as those used in some gaming systems). The information determined by proximity sensor 32 is provided to processor 30. Additionally or alternatively, one or both of external listener sensing devices 40 and 42 are used to detect the presence of and/or position of and/or angle of a person relative to the particular sensor. Sensor 40 is an external proximity sensor that is separate from speaker 22. Sensor 42 is an external location tracking sensor that is separate from speaker 22. Sensors 40 and/or 42, when used, are enabled to communicate with processor 30 either via hard wiring or wirelessly through wireless communication function 34, such as by Bluetooth or WiFi.

Processor 30 is thus provided with information that is used to establish the presence of a person in the vicinity of speaker 22. In some examples this information includes the distance of the person from the speaker. In some examples this information includes the angle of the person from the speaker, for example whether the person is in front of, to the side of, or behind the speaker. Processor 30 uses this presence/location information to alter the audio signals provided to at least driver 24, to better accomplish immersive audio to the person. In some examples processor 30 provides immersive audio by altering one or more of the volume of driver 24, the time delay of driver 24, the equalization of driver 24, and the radiation pattern of driver 24.

In some examples one speaker is the master device that is configured to command the loudspeakers to alter their audio outputs at least in part based on the distance of the person from the loudspeaker. Coordinated control of multiple speakers is especially useful when there are multiple speakers in a listening space that are all playing the same sound, or sounds that are meant to be heard together such as with a stereo pair of speakers or a surround sound setup that can have multiple coordinated speakers. For example, wireless communications function 34 of speaker 22 can be configured to communicate with one or more other speakers. The presence of/location of a listener relative to each speaker (such as illustrated in FIG. 1) can be determined by sensors that are part of each speaker and/or are separate, such as sensors 40 and 42. Any or all of such sensors can communicate with master processor 30, such as through wireless communications function 34. Processor 30 can be configured to process the listener's location information and calculate and send commands to the other speakers via wireless communications 34 to alter their outputs based on the determined location of the person relative to that particular loudspeaker. In some examples these commands are configured to cause each loudspeaker to adjust one or both of the volume and time delay of its audio output. A goal of this control of multiple speakers in a listening space is to create a more immersive sound field for the listener in which the volume of the sound from the multiple speakers is more balanced than it would be without the control, and these sounds reach the listener's ears at about the same time.

In examples in which only one speaker is involved, the speaker could know whether or not a person is standing directly proximate to the speaker, such as directly under it (or within X distance of being directly proximate to it, such as within 0-1 meters). This could be detected with a simple proximity sensor, and that proximity sensor may only give a binary reading of "person detected" or "person not detected." The audio output could then be adjusted accordingly, such as reducing volume if a person is detected and increasing volume if not.

In examples of a more complex scenario, the position of one or more people in a given environment is tracked, and the audio output of multiple speakers in the given environment is adjusted accordingly, to maintain a better multichannel image (e.g., a better stereo image). This could be achieved by adjusting the time alignment, level, equalization, radiation pattern, and/or channel of one or more of the multiple speakers. By way of example, if two speakers were being used to provide stereo output where one speaker outputs the left channel and the other outputs the right channel, then as the system uses one or more sensors (e.g., one or more proximity sensors, cameras, LIDAR systems, etc.) to detect that a user is moving or has moved closer to one of the two speakers, that closer speaker could at least one of i) decrease volume, ii) increase playback delay, iii) adjust the equalization (e.g., decrease treble to reduce the higher frequencies as the user is closer), iv) adjust the radiation pattern (e.g., to decrease directivity toward the user), or v) adjust the channel output (e.g., mixing in some center content to help provide some of the other channel output from that closer speaker). The farther speaker could also or alternatively perform the opposite, i.e., adjust the audio output in at least one of the following manners: i) increase volume, ii) decrease playback delay, iii) adjust the equalization (e.g., increase treble to help the higher frequencies better reach the user), iv) adjust the radiation pattern (e.g., to increase directivity toward the user), or v) adjust the channel output (e.g., reduce the amount of center channel that is mixed into the output, assuming some was mixed in in the first place, to increase its own stereo channel output).

Figure 3A:
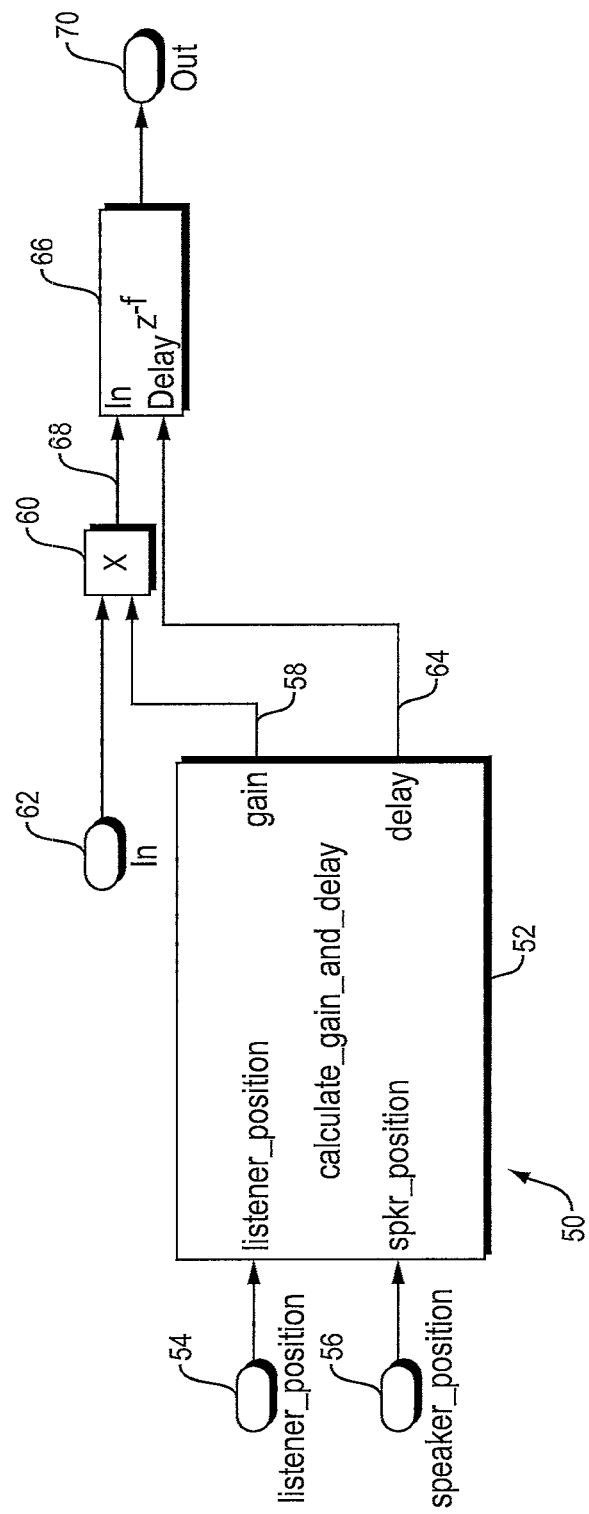
FIG. 3A is a schematic diagram of the application of gain and delay to an audio signal based on the position of the listener relative to the loudspeaker.

FIG. 3A illustrates exemplary gain and delay control 50 as accomplished by properly programmed processor 30, FIG. 2. The speaker position 56 and the listener position 54 are provided to gain and delay calculation 52. In some examples the absolute locations of the speaker(s) and/or the absolute locations of the listener(s) is determined. For example, GPS or cameras could be used to obtain the absolute locations of speakers and/or people. In some examples the speaker position is unknown and the listener position is determined relative to the speaker (e.g., a person is within 1 meter of a speaker), in which case there would be no input 56, and input 54 would be the distance of the listener rather than the position of the listener. The calculated gain 58, along with the nominal input audio signals 62, are provided to multiplication function 60. The resulting revised gain 68, along with the calculated time delay 64, are provided to audio signal delay function 66, with its outputted audio signals 70 (which have an appropriately adjusted gain and/or time delay) provided to the audio driver(s).

To illustrate gain and delay calculation: The distance r from known speaker position (x,y,z) and listener position (x,y,z) can be calculated as:

$$r = \sqrt{(x_{spkr} - x_{listener})^2 + (y_{spkr} - y_{listener})^2 + (z_{spkr} - z_{listener})^2}$$

In some examples gain (G) is then calculated relative to a nominal distance $r_{nominal}$ where the gain is defined to be 1 at the nominal distance.

$$G = \frac{r}{r_{nominal}}$$

In some examples a maximum gain Gmax and a minimum gain Gmin are defined, and if the calculated gain exceeds Gmax it is forced to Gmax, or if the gain goes below Gmin then it is forced to Gmin.

In some examples delay is calculated as follows. Start with a nominal delay $d_{nominal}$. Delay d in samples is calculated from:

$$d = d_{nominal} - \frac{r - r_{nominal}}{c} f_s$$

where r and rnominal are as above, c is the speed of sound in air (343 m/s), and fs is the sample rate. The delay goes down as the listener gets further away from the speaker and goes up when the listener gets closer to the speaker. This delay plus the acoustic propagation delay from the speaker (what the listener experiences) should equal $d_{nominal}$. The nominal delay needs to be there because the delay can't be less than zero when the listener moves far away from the speaker.

Figure 3B:
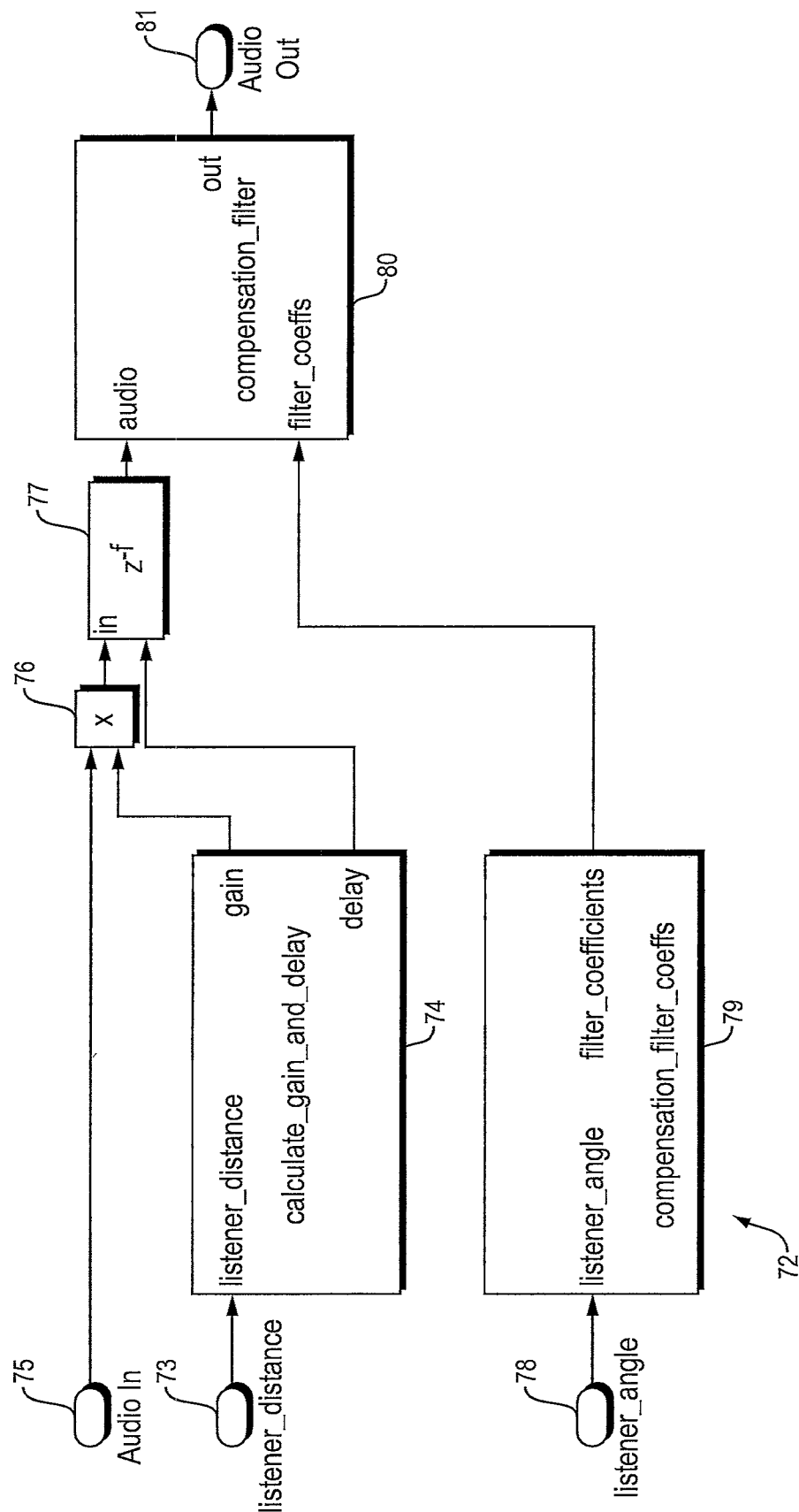
FIG. 3B is a schematic diagram of the application of a filter to compensate for off-axis frequency response.
Figure 4A:
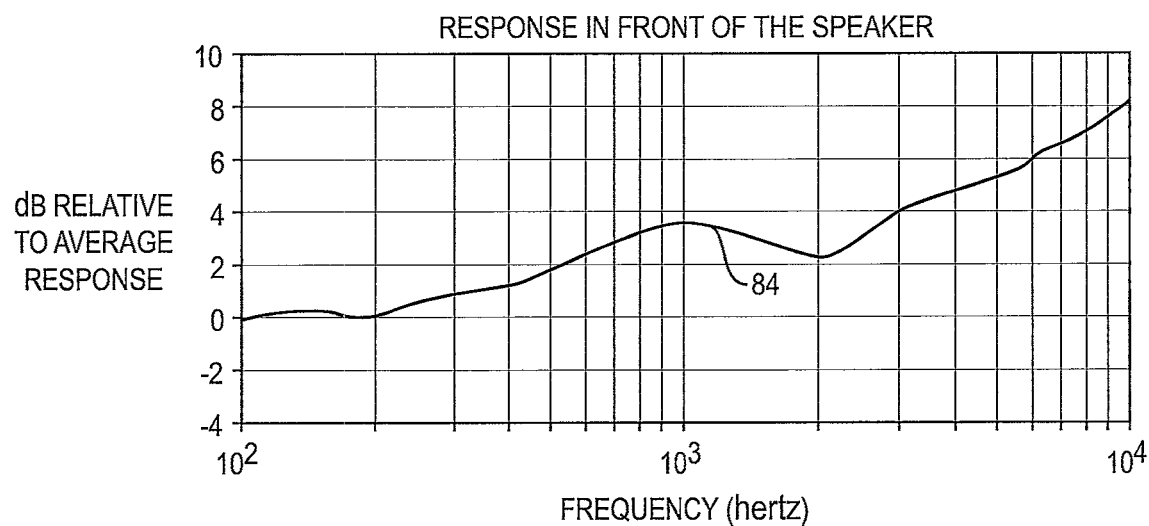
FIG. 4A is a plot of loudspeaker output at the location of a listener in front of the speaker (in dB) vs. frequency.
Figure 4B:
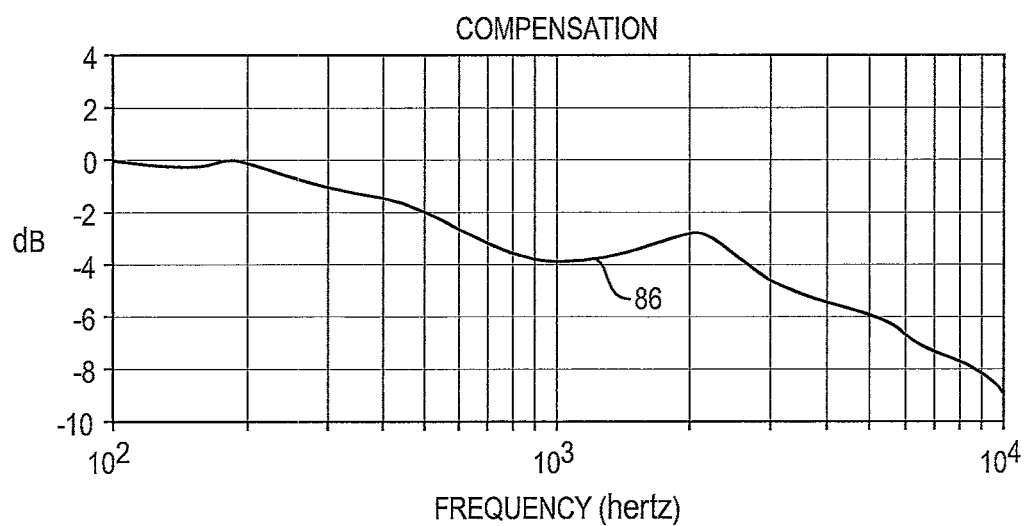
FIG. 4B is a plot of compensation that can be applied to the loudspeaker to return the speaker output to nominal at the listener's location.

The output of many loudspeakers, including typical omnidirectional speakers, becomes more directional at higher frequencies. In such cases the speaker's volume can drop off with frequency to the side and back of the speaker, as compared to in front of the speaker. The present system can be configured to compensate for this off-axis frequency response. In an example illustrated in FIG. 3B, system 70 compensates for both listener distance 73 and the angle 78 of the listener to the speaker. Gain and delay calculation 74 calculates a gain that is provided to summing function 76 along with input audio 75, and also calculates delay 74 that is provided to delay function 77 along with the output of summing function 76. Listener angle 78 is compensated for using filter coefficient generator 79 that has its output provided to audio compensation filter 80, which is also inputted with the output of function 77. Compensated audio output 81 is proved to the speaker (not shown). In some examples the listener angle compensation is based on the average response of the speaker at 360 degrees around the speaker. The speaker output volume can be altered based on the listener's angle to the speaker, to produce an output that is calculated to produce a nominal response at the user's position. As an example, FIG. 4A illustrates curve 84, which is a response with frequency of a speaker at a position directly in front of the speaker, as compared to the average response of the speaker at all angles relative to the speaker. The directionality at higher frequencies is illustrated by the response increasing well above nominal, particularly at frequencies greater than about 2 kHz. FIG. 4B illustrates curve 86, which is a compensation that can be accomplished by the processor, to provide a nominal response at the particular position (in front of the speaker) across the frequency range. Thus, since at higher frequencies the response of the speaker increases as compared to at positions to the side and behind the speaker, the processor would need to create a response(FIG. 4B) that is the inverse of the FIG. 4A curve, in which the volume is decreased with frequency as shown. In contrast, at 180 degrees around the speaker (i.e., at the back), the response drops off with frequency and the compensation thus would increase with frequency.

Phased-array speaker systems include multiple audio drivers arranged such that their outputs can be beamformed, as is known in the art. Beamforming can be used to steer the main sound beam or lobe in a desired direction. Beamforming may involve changing the volume and phase of the speakers as a function of frequency to develop desired directionality. In some examples herein the directivity of the main sound lobe of a multiple audio driver loudspeaker is adjusted based on the listener's position. For example, in a phased array speaker system when the listener's angular position relative to the loudspeaker is known, the drivers can be beamformed to direct the sound at the position of the listener.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

Functions, methods, and/or components of the methods and systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuits) (ASIC), general computing processor(s), micro-controller(s), and the like, or any combination of these, may be suitable, and may include analog or digital circuit components and/or other components with respect to any particular implementation.

Functions and components disclosed herein may operate in the digital domain, the analog domain, or a combination of the two, and certain examples include analog-to-digital converters) (ADC) and/or digital-to-analog converter(s) (DAC) where appropriate, despite the lack of illustration of ADC's or DAC's in the various figures. Further, functions and components disclosed herein may operate in a time domain, a frequency domain, or a combination of the two, and certain examples include various forms of Fourier or similar analysis, synthesis, and/or transforms to accommodate processing in the various domains.

Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An audio system that is configured to more evenly distribute sound across an environment in which the audio system is located, comprising:
    a loudspeaker configured to create an audio output at 360 degrees around the loudspeaker, wherein the audio output is characterized by a volume output response that varies, relative to an average loudspeaker volume response determined at 360 degrees around the loudspeaker, at different frequencies across a loudspeaker output frequency range, wherein the loudspeaker volume output response has a front volume versus frequency characteristic to the front of the loudspeaker, and a different off-axis volume versus frequency characteristic behind the loudspeaker;
    a sensor configured to detect the location of a person either in front of the loudspeaker or behind the loudspeaker; and
    a processor, responsive to the sensor, configured to cause the loudspeaker to vary the volume of the audio output of the loudspeaker relative to the loudspeaker volume output response for the detected location of the person, either in front of the loudspeaker or behind the loudspeaker,
    wherein the volume variation of the loudspeaker is indirectly related, across the loudspeaker output frequency range, to one of either the front volume versus frequency characteristic of the loudspeaker or the off-axis volume versus frequency characteristic of the loudspeaker, depending on whether the person is in front of the loudspeaker or behind the loudspeaker, respectively.

2. The audio system of claim 1, wherein the processor is further configured to cause the loudspeaker to adjust the time delay of the loudspeaker audio output based on the position of the person relative to the loudspeaker.

3. The audio system of claim 1, wherein the sensor is further configured to determine at least one of a distance of the person from the loudspeaker or a location of the person.

4. The audio system of claim 3, wherein the processor is further configured to cause the loudspeaker to alter its audio output at least in part based on at least one of the distance of the person from the loudspeaker or the location of the person.

5. The audio system of claim 1, wherein the sensor is part of the loudspeaker.

6. The audio system of claim 1, wherein the sensor is selected from the group of sensors consisting of a LIDAR sensor, an ultra-wide band sensor, a simultaneous location and mapping (SLAM) system, a time-of-flight infrared (IR) camera, an IR motion sensor, a SONAR sensor, a WiFi fingerprinting system, and a video camera.

7. The audio system of claim 1, comprising a plurality of loudspeakers spaced about a listening space.

8. The audio system of claim 7, wherein the processor is further configured to vary the volume of the audio outputs of each of the plurality of loudspeakers.

9. The audio system of claim 7, wherein the processor is further configured to alter a time delay of the audio outputs of each of the plurality of loudspeakers based on whether the person is in front of, to the side of, or behind the loudspeaker.

10. The audio system of claim 7, wherein the sensor is configured to determine a distance of the person from each of the plurality of loudspeakers.

11. The audio system of claim 10, wherein the processor is configured to cause each of the plurality of loudspeakers to alter their audio outputs based on the distance of the person from that loudspeaker.

12. The audio system of claim 10, wherein each of the plurality of loudspeakers comprises a proximity sensor.

13. The audio system of claim 12, wherein each proximity sensor is selected from the group of proximity sensors consisting of a LIDAR sensor, an ultra-wide band sensor, a simultaneous location and mapping (SLAM) system, a time-of-flight infrared (IR) camera, an IR motion sensor, a SONAR sensor, a WiFi fingerprinting system, and a video camera.

14. The audio system of claim 7, wherein each loudspeaker is configured to communicate with at least one other loudspeaker.

15. The audio system of claim 14, wherein one of the plurality of loudspeakers is configured to send commands to the other loudspeakers of the plurality of loudspeakers to alter the outputs of each of the other loudspeakers based at least on whether the person is in front of, to the side of, or behind the loudspeaker.

16. The audio system of claim 15, wherein the commands are configured to cause each loudspeaker to adjust the volume and time delay of its audio output.

17. The audio system of claim 7, wherein each loudspeaker comprises a sensor and wherein each loudspeaker is configured to communicate with each other loudspeaker, to coordinate alterations of the audio outputs of the plurality of loudspeakers.

18. The audio system of claim 1, wherein the loudspeaker comprises a plurality of audio drivers, and wherein the processor is further configured to cause the drivers to alter their level and phase to change a directivity of the collective output of the plurality of audio drivers.

19. An audio system that is configured to more evenly distribute sound across a listening space in which the audio system is located, comprising:
   a plurality of loudspeakers spaced about the listening space, wherein each loudspeaker is configured to create an audio output at 360 degrees around the loudspeaker, wherein the audio output of each loudspeaker is characterized by a volume output response that varies, relative to an average loudspeaker volume response determined at 360 degrees around the loudspeaker, at different frequencies across a loudspeaker output frequency range, wherein the loudspeaker volume output response has a front volume versus frequency characteristic to the front of the loudspeaker, and a different off-axis volume versus frequency characteristic behind the respective loudspeaker;
   a sensor associated with each loudspeaker, wherein each sensor is configured to detect at least the distance of and the location of a person either in front of the loudspeaker or behind the loudspeaker with which the sensor is associated; and
   a processor configured to cause each loudspeaker, responsive to the loudspeaker's sensor, to alter a volume and a time delay of the loudspeaker's audio output based on the distance of the detected person from the respective loudspeaker, and whether the detected location of the person is either in front of the respective loudspeaker or behind the respective loudspeaker,
   wherein the volume variation of each respective loudspeaker is indirectly related, across the loudspeaker output frequency range, to one of either the front volume versus frequency characteristic of the loudspeaker or the off-axis volume versus frequency characteristic of the loudspeaker, depending on whether the person is in front of the respective loudspeaker or behind the respective loudspeaker, respectively.

20. The audio system of claim 19, wherein the plurality of loudspeakers are configured to communicate, to coordinate alterations of the audio outputs of the plurality of loudspeakers.

21. The audio system of claim 1, wherein the front volume versus frequency characteristic of the loudspeaker has an increased volume at higher frequencies, and wherein the volume variation of the loudspeaker when the person is in front of the loudspeaker is inversely proportional to its front volume versus frequency characteristic, such that it has a decreased volume at higher frequencies, and wherein the off-axis volume versus frequency characteristic of the loudspeaker has a decreased volume at higher frequencies, and wherein the volume variation of the loudspeaker when the person is behind the loudspeaker is inversely proportional to its off-axis volume versus frequency characteristic, such that it has an increased volume at higher frequencies.

* * * * *